United States Patent [19]

Dagenais

[11] Patent Number: 4,462,439
[45] Date of Patent: Jul. 31, 1984

[54] CHAIN SAW WITH SINGLE-WEDGE, CHAIN-PROTECTING CHAIN SUPPORT

[76] Inventor: Joseph E. Dagenais, 3712-17th Ave., Vernon, B.C., Canada, V1T 1C1

[21] Appl. No.: 499,306

[22] Filed: May 31, 1983

[51] Int. Cl.³ .............................................. A01G 23/08
[52] U.S. Cl. .................................. 144/34 R; 30/123.4; 30/379.5; 83/928; 144/336
[58] Field of Search ................. 83/928; 30/379.5, 373, 30/371, 123.4; 144/2 Z, 3 D, 34 R, 335, 336, 34 E

[56] References Cited

U.S. PATENT DOCUMENTS

| | | | |
|---|---|---|---|
| 2,748,810 | 6/1956 | Strunk | 30/123.4 |
| 3,565,138 | 2/1971 | Albright | 144/34 R |
| 3,581,783 | 6/1971 | Sandin | 30/123.4 |
| 3,604,479 | 9/1971 | Jordan et al. | 144/34 R |
| 3,610,301 | 10/1971 | Jordan | 144/34 R |
| 3,612,115 | 10/1971 | Albright | 144/34 R |
| 3,672,412 | 6/1972 | Albright | 144/34 R |
| 3,796,242 | 3/1974 | Albright | 144/34 R |
| 3,848,648 | 11/1974 | Dika et al. | 144/34 R |
| 3,854,510 | 12/1974 | Matlik | 144/34 R |
| 3,872,901 | 3/1975 | Bernard | 144/34 R |
| 3,874,432 | 4/1975 | Albright | 144/34 R |
| 3,915,209 | 10/1975 | Denis | 144/34 R |
| 3,991,799 | 11/1976 | Albright | 144/34 R |
| 4,081,009 | 3/1978 | Curlett | 144/34 R |
| 4,116,250 | 9/1978 | Ericsson | 144/34 R |

Primary Examiner—W. D. Bray
Attorney, Agent, or Firm—Kolisch, Hartwell, Dickinson & Anderson

[57] ABSTRACT

A chain saw mountable on a powered vehicle having a chain support with a loop-defining chain run including an exposed cutting run portion. The chain support has a lower surface which defines a lower tree-cutting surface along which the lower support surface travels during cutting. The non-cutting run portion of the chain loop is disposed coincident with or above this lower surface. The upper surface of the support covers the non-cutting run portion and has a general wedge-shaped tapering toward the cutting run portion.

9 Claims, 5 Drawing Figures

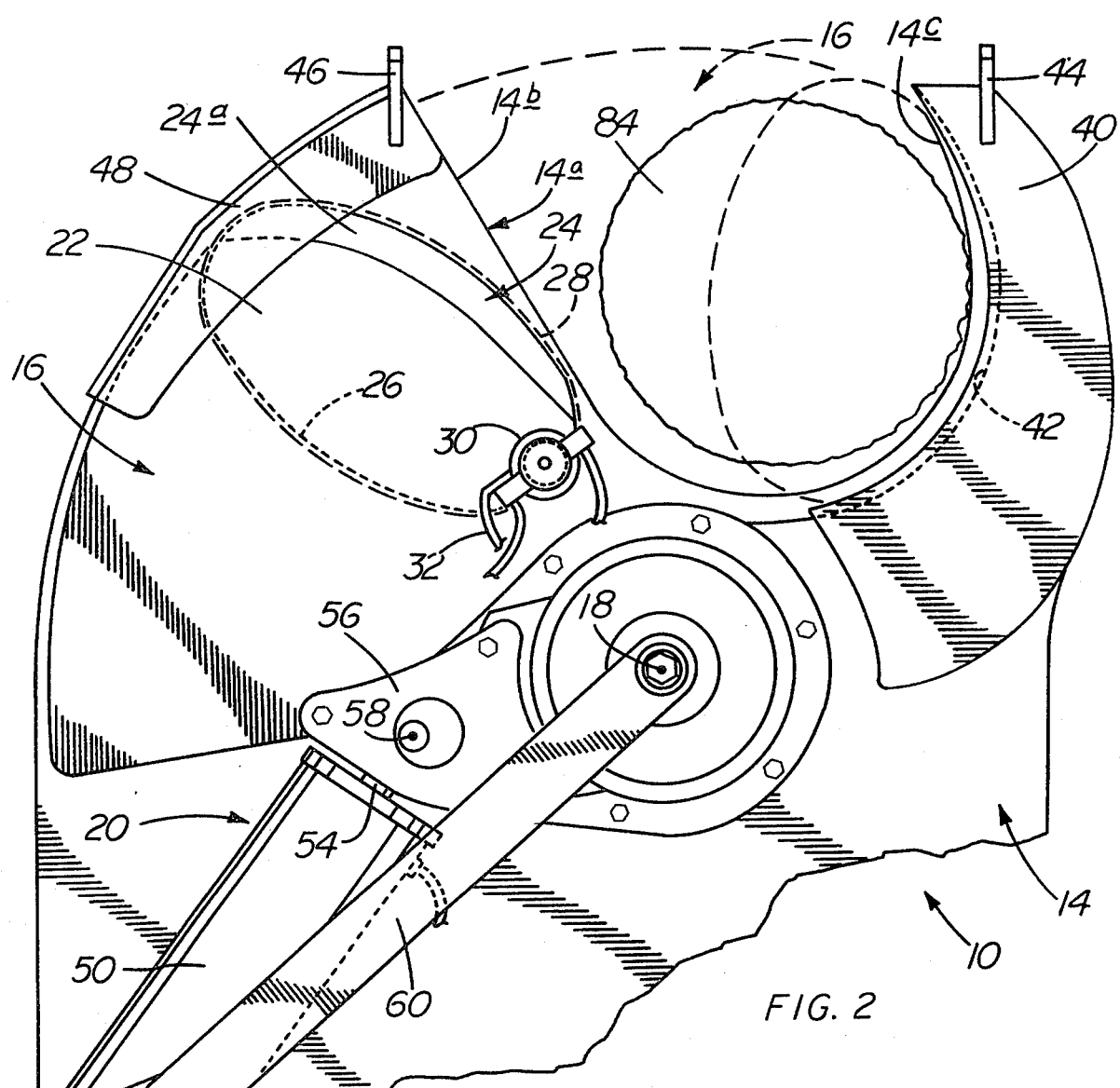
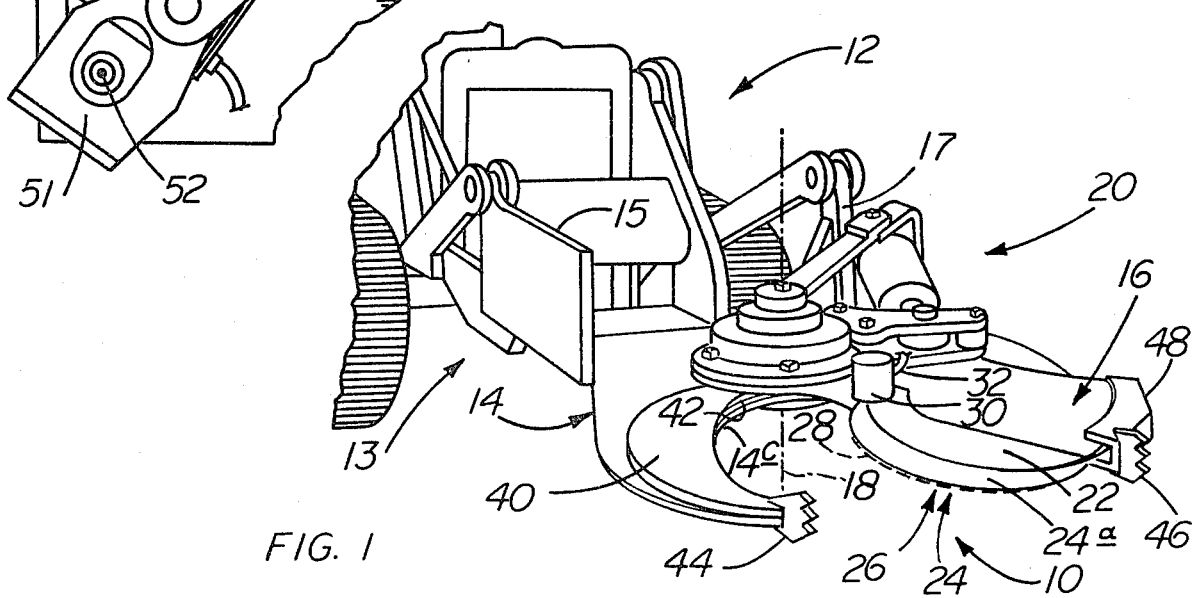
FIG. 2
FIG. 1

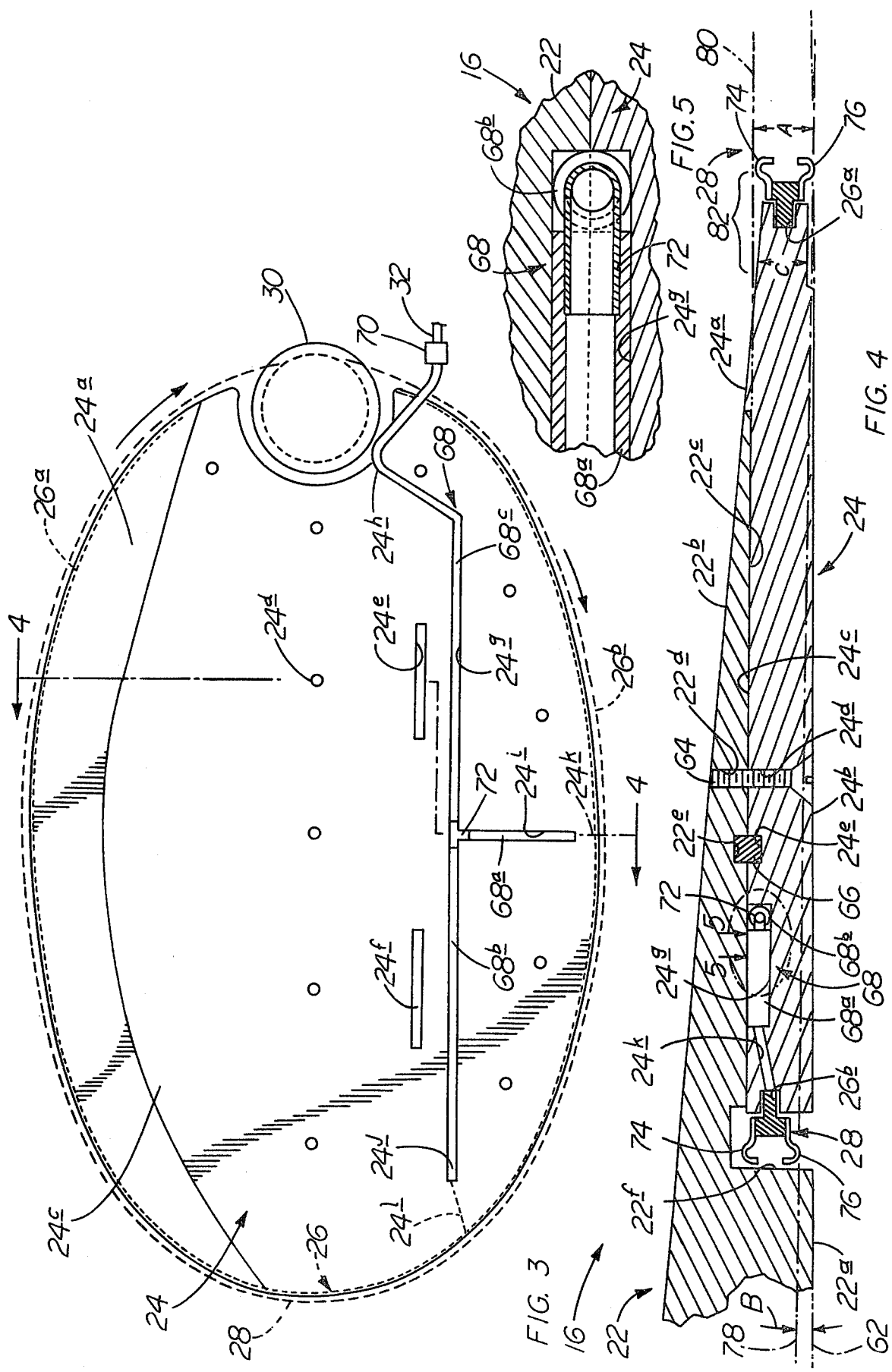

CHAIN SAW WITH SINGLE-WEDGE, CHAIN-PROTECTING CHAIN SUPPORT

BACKGROUND AND SUMMARY OF THE INVENTION

This invention pertains to a chain saw mountable on a powered vehicle, and in particular, to such a chain saw having single-wedge-shaped chain support.

In an effort to maximize the rate at which trees are cut during timber harvesting, various devices have been constructed for the mechanical harvesting of trees. Two general approaches have been applied for solving this problem. One of them is to use devices attachable to a motor vehicle, such as a tractor, having cutting blades for slicing through a tree under hydraulic pressure. An example of such a devices is described in my prior U.S. Pat. No. 4,384,599 for "Slicing Apparatus for Felling Trees", to be issued on May 24, 1983.

Because of the forces involved in slicing there is invariably some tree fiber damage due to the compression required to force a blade laterally through a tree trunk. The solution to this problem has typically been the use of a chain saw mounted on the front of a tractor for mechanically felling trees. An approach has been to pivotally swing or transversely shift a conventional straight chain bar across an expanse in order to effect the cutting of a tree. Such a saw has substantial problems with back cutting and biting by the portion of the chain traveling on the bar over the non-cutting portion of the chain run. Additionally, when chain stretch occurs due to heat and force on the chain, the straight edges tend to produce loose chain travel. The curved ends around which such a chain travels tend to build up in heat because of the friction concentrated along those areas. This also contributes to shortened chain life.

Two types of devices have been developed in order to overcome these problems. One such device includes a wedge-shaped bar tapered on both sides toward the cutting edge for protecting the chain during the non-cutting portion of travel. A problem with this type of bar is that the lower cut surface of a tree is parallel to the direction of cut and quite immobile. The lower bar surface is forced to follow this lower tree cut surface due to the pinching action of the tree on the bar. The trailing edge of the bar therefore twists upwardly in order to accommodate this situation.

Alternatively, the width of the bar has been extremely enlarged in some cases with the intent being that the trailing edge of the chain run does not pass the edge of a tree being cut. This solution naturally requires that the diameter of trees being cut is limited to a distance less than the width of the chain bar.

It is therefore a general object of the present invention to overcome these problems of the noted prior art.

More specifically, it is a desired objective to provide a chain saw with a generally horizontal lower bar surface and an isolated trailing or non-cutting chain run.

The preferred embodiment of the present invention is a retrofit of a tree slicer made as disclosed in my above-noted U.S. patent. It comprises a chain saw mountable on a powered vehicle having a wedge-shaped chain support which tapers down to an arcuate leading edge along which a chain travels. The support has a lower generally horizontal surface and an upper surface which tapers to the leading edge. A non-cutting chain run is recessed within the support above the horizontal lower surface. The support is pivotally attached to a base plate for hydraulically forcing the same through a tree during cutting. It also has conduit means embedded in it for transmitting lubricating oil directly into the chain run during cutting.

It can be seen that such a chain saw having a wedge-shaped support tapering toward the cutting run with a horizontal lower surface provides for tree lean without twisting of the bar. Also, a chain support which essentially encloses the non-cutting chain run avoids back-cutting and biting of the chain during operation. With in-run chain lubricating, chain life is extended even further.

These and additional objects and advantages of the present invention will be more clearly understood from a consideration of the drawings and the detailed description of the preferred embodiment which follows.

BRIEF DESCRIPTION OF THE DRAWINGS

FIG. 1 is a perspective view of a preferred embodiment of the invention mounted on the front of a tractor (shown in partial view) with a chain support structure in a partially closed position.

FIG. 2 is an enlarged partial plan view of the apparatus of the invention shown in FIG. 1 in position preparatory to slicing a tree shown in transverse outline.

FIG. 3 is a top view of a chain bar of the apparatus of FIG. 2.

FIG. 4 is a fragmentary, partial cross-sectional view taken along line 4—4 in FIG. 3 of the chain bar of that figure mounted as shown in FIG. 2.

FIG. 5 is an enlarged fragmentary view of a portion of FIG. 4 contained within line 5—5 of FIG. 4 in cross-section.

DETAILED DESCRIPTION OF THE INVENTION

Turning now to the drawings, and referring first to FIGS. 1 and 2, indicated generally at 10 is a chain saw constructed in accordance with the present invention. Also indicated generally at 12 (in FIG. 1), is a tractor upon which chain saw 10 is mounted. Included within saw 10 are a base plate 14 having a notch 14a therein. Plate 14 is substantially planar and composed of a strong metal, preferably steel. An apparatus support frame 13, suspended from the front of tractor 12, is attached to the rear edge of plate 14 and to vertical frame supports 15, 17. A plate-like chain support structure 16 is pivotally attached to plate 14 about an axis shown as dash-dot line 18, and a chain support structure driver 20. Support structure 16 is also referred to herein as chain-carrying means and driver 20 is also referred to as power means for swinging chain-carrying means.

Chain support structure 16 includes what will also be referred to herein as a wedge 22. Mounted on the undersurface of the wedge is a chain bar 24 an arcuate portion of which, also referred to as leading edge 24a, is exposed upwardly, as shown. Bar 24 includes a chain 26 which has an overall arcuate path as shown particularly in FIG. 2. Run 26 includes a cutting run portion 26a which travels along leading edge 24a and an opposing non-cutting run portion 26b comprising the remaining portion of run 26. A continuous-loop saw chain 28 is disposed for continuous travel along run 26. A hydraulic chain-driving motor 30, also referred to herein as chain-driving means, is operatively mounted on plate 14 for driving chain 28 about run 26. A chain oil supply line 32 attaches to a conduit disposed within structure 16 as will be discussed in more detail subsequently. Supply line 32 provides lubricating oil from a fluid system in tractor 12.

Notch 14a includes a notch side 14b which is disposed near structure 16 when saw 10 is in the open position shown in FIG. 2. Another notch side 14c forms the opposite side of the notch from side 14b. Disposed on plate 14 adjacent notch side 14c is an anvil portion 40 which serves to strengthen that side of the plate and, additionally to form a recess 42 disposed and sized for receipt of leading edge 24a when the chain saw is in the closed position as shown in phantom lines in FIG. 2. At the distal end of anvil portion 40 is an anvil brace 44. A similar and cooperating brace 46 and a chain saw structure guard 48 are mounted on the outer margins of plate 14 adjacent notch side 14b as shown in FIGS. 2 and 3.

As mentioned previously, structure 16 is mounted for pivoting on plate 14 about axis 18. A hydraulic cylinder 50 is pivotally mounted to bracket 51 for pivoting about pivot point 52. Bracket 51 is fixedly attached to plate 14. A piston 54 associated with cylinder 50 is pivotally and eccentrically attached about axis 18 to member 56. This member is pivotable relative to piston 54 about point 58 shown in FIG. 2. Hydraulic activation of cylinder 50 therefore provides for pivoting of structure 16 about axis 18 relative to plate 14 between the open position shown in solid line in FIG. 2 to the closed position shown in phantom lines. A thrust restraint bar 60 has one end pivotally secured to the pivoting shaft associated with axis 18 and its opposite end pivotally secured to bracket 51 adjacent the point of attachment of cylinder 50 thereto.

Completing now the description of chain saw 10 with reference particularly to FIGS. 3, 4, chain support structure 16, composed of wedge 22 and bar 24, has a generally horizontal lower surface shown as surfaces 22a, 24b in FIG. 4. These surfaces lie on a plane shown as dash-double-dot line 62. As structure 16 pivots about axis 18, these lower surfaces—forming the lower surface of structure 16—follow plane 62, and define thereby a lower tree-cut surface during a tree—felling operation.

The perimeter of bar 24, as shown in FIG. 3, defines an outer groove which forms chain run 26 discussed previously. The upper portion of run 26 forms cutting run portion 26a. Adjacent run 26a is an upper surface 24a which tapers down toward run 26a. The remainder of the upper surface of bar 24 is generally flat as shown in FIG. 4 and forms what will be referred to herein as a bar-mounting surface 24c.

Wedge 22 can be seen to have an upper surface 22b which tapers from a thickness greater than that of bar 24 adjacent the non-cutting run portion of bar 24 to a very narrow portion adjacent and abutting the upper tapered surface 24a of bar 24 so that upper surfaces 22b, 24a form an upper surface for structure 16 which tapers toward cutting run portion 26a, as shown in FIG. 4. Upper surface 22b tapers preferably at an angle of approximately three degrees relative to lower surface 22a. Wedge 22 has a lower mounting surface 22c which is flush with bar mounting surface 24c.

Bar 24 has a plurality of appropriately threaded apertures, such as aperture 24d which are in alignment with corresponding threaded apertures in wedge 22 such as aperture 22d shown in FIG. 4. Bolts, such as bolt 64, are screwed into the aligned apertures, such as apertures 24d, 22d. These bolts are used to hold the two mounting surfaces of wedge 22 and bar 24 together as shown. A pair of rectangular, generally elongate, channels or keyways 24e, 24f are disposed generally parallel with run 26a in mounting surface 24c. Complementary keyways exist in wedge 22, such as keyway 22e. Each pair of complementary keyways forms a combined keyway for snug receipt of a key 66. Key 66 transfers the stress forces from bar 24 to wedge 22 during a cutting operation.

An additional channel 24g, having a generally T-shaped configuration as viewed in FIG. 3 extends from an inlet 24h disposed adjacent a bay 24m which is sized to freely receive a sprocket drive on motor 30 for driving connection between the motor and chain 28. Opposite from inlet 24h is a pair of outlets 24i, 24j. Each of these outlets is connected to corresponding portions of run 26 through tunnels 24k, 24l, shown in dashed lines in FIG. 3. Oil supply tube 68 is connected to supply line 32 through a coupling 70. Also referring to FIG. 5, tube 68 includes two outlet sections 68a, 68b and an inlet section 68c all joined together by a T-connector 72 for communication with tunnels 24k, 24l.

Chain 28 includes what are referred to as upper cutting teeth, such as tooth 74, and lower cutting teeth, such as tooth 76, as viewed in FIG. 4. Upper and lower teeth 74, 76, during operation in felling a tree, cut out a section of wood, leaving what is known in the trade as a kerf having a defined thickness identified as distance "A" in FIG. 4. The lower edges of teeth 76 therefore form, during travel in run 26, what may be considered a lower kerf margin, identified as dash-dot line 78 in FIG. 4. Correspondingly, an upper kerf margin formed by upper teeth 74 is shown as dash-double-dot line 80. It can be seen that wedge 22 contains a recess 22f sized for unobstructive receipt of chain 28 throughout the non-cutting run portion of chain travel during operation. Non-cutting run portion 26b is disposed relative to lower bar surface 24b, and therefore plane 62, in such a manner that lower kerf margin 78 is disposed coincident with or preferably just above plane 62 as shown, at an angle referred to as angle "B" in FIG. 4. Cutting run portion 26a is disposed so that the portion of lower kerf margin 78 associated with it is generally coincidental with lower surface plane 62.

One should also note that the thickness of bar 24 in a region 82 adjacent cutting run portion 26a is less than kerf thickness "A". This bar thickness, shown as dimension "C" in FIG. 4, is sized less than the kerf so that structure 16 will not contact a tree during the first few inches of cut. Thus, as chain 28 saws into a tree, bar 24 initially does not interact, and therefore interfere, with the tree structure to alter the alignment of chain 28 with the tree relative to lower plane 62. This assures that a cut will take place smoothly along plane 62, which, as the reader will recall, is coplanar with the travel of lower surface 24b.

In operation, chain 28 is driven around run 26 on bar 24 by hydraulic operation of motor 30. Lubricating oil is selectively dispensed from supply line 32 through oil transmission line 68 and out tunnels 24k, 24l into run 26. Tractor 12 is maneuvered until a suitably sized tree, such as tree 84, is positioned in notch 14a as shown in FIG. 2. Structure 16 is then pivoted about axis 18 by hydraulic driver 20, causing bar leading edge 24a to pivot across notch 14a cutting through tree 84 in the process. The speed of structure 16 relative to notch 14a is chosen based on the actual speed of chain 28 about run 26 as well as the dimension and type of tree being felled.

Applicant has found that a chain saw 10, as described, can be operated at much higher speeds than normal chain saws and for longer periods of time without excessive chain wear or overheating. Frictional heat is distributed all along the arcuate chain run. Fewer adjustments to the chain are required during operation because the arcuate path distributes any stretch or looseness which develops in the chain along its length and does not have any straight sections which can cause a chain to slip out of its run. The chain saw cuts faster than conventional chain saws for the same speed because its cutting path is arcuate and therefore longer than a corresponding straight line cut. Additionally, since the leading edge of the chain saw is arcuate, the heart of the tree is cut earlier than a conventional chain saw. Also, the arcuate leading edge generally conforms with the last-cut edge of a tree. There is thus a substantial reduction in fiber structure damage of a type known in the trade as "barber chairing".

With the bar and wedge, forming a chain support structure, having a horizontal lower surface defining and following a lower cutting plane during operation, there is no twisting of the chain support structure as must result from a typical bar having both upper and lower tapered surfaces. This result is achieved by disposing the non-cutting chain run portion coincident with or slightly above the horizontal lower support surface while causing the cutting run portion to travel generally in a plane which is coincidental with the horizontal lower surface. The upper wedge portion simply pushes the tree in the direction it ultimately takes upon completion of a cut. Additionally, having the tree-contacting wedge recessed from the cutting edge, there is a minimum of fiber deformation occurring during a cut. The support structure also acts as a large heat sink for improved heat dissipation during operation.

Finally, a lubrication system is provided which is disposed substantially centrally of the chain run. This system applies lubrication directly in the run where it will have the greatest benefit and effectiveness.

Although a preferred embodiment of this invention has been described with reference to a chain saw which forms a retrofit for a tree slicer as described in my prior U.S. patent application noted previously, it is not limited to that particular application. Thus, while the invention has been particularly shown and described with reference to the foregoing preferred embodiment, it will be understood by those skilled in the art that other changes and form and detail may be made therein without departing from the spirit and scope of the invention as defined in the following claims.

It is claimed and desired to secure by Letters Patent:

1. A chain saw mountable on a powered vehicle to fell trees comprising
    plate-like chain-carrying means including a chain bar having a generally planar loop-defining chain run including an exposed cutting run portion and an opposed non-cutting run portion,
    a continuous loop saw chain operatively disposed in said run, and
    means drivingly connected to said chain for driving the chain around the run,
    said bar having a generally planar lower surface extending between said cutting and non-cutting run portions and defining a lower tree-cutting surface, said run being disposed in such a manner that said chain, during operation, defines a lower kerf margin which is generally coincident with said lower surface along said cutting run portion and is disposed not lower than said lower surface along the non-cutting run portion.

2. A chain saw mountable on a powered vehicle to fell trees comprising
    a base plate having a notch therein of a size suitable for receiving tree trunks having diameters within a known range, said notch having opposite sides,
    plate-like chain-carrying means including a chain bar having a generally planar loop-defining chain run including an exposed cutting run portion and an opposed non-cutting run portion, said chain-carrying means being pivotally attached to said plate for swinging across said notch from one of said sides toward the other side with said cutting run portion forming the leading edge when so pivoted,
    a continuous loop saw chain operatively disposed in said run,
    means drivingly connected to said chain for driving said chain around said run, and
    power means for swinging said chain-carrying means between said two notch sides,
    said bar further having a generally planar lower surface extending between the cutting and non-cutting run portions and defining a lower tree-cutting surface as said chain-carrying means is operatively pivoted across said notch, and wherein said run is disposed in such a manner that said chain, during operation, defines a lower kerf margin which is generally coincident with said lower surface along said cutting run portion and is disposed not lower than said lower surface along the non-cutting run portion.

3. The chain saw of claim 2 wherein said chain-carrying means is generally wedge-shaped, having an upper surface tapering generally uniformly toward and adjacent said leading edge and covering the chain disposed in the non-cutting portion of said run.

4. The chain saw of claim 3 wherein said chain, during operation, also defines a kerf of predetermined thickness and further wherein said chain-carrying means, only immediately adjacent said leading edge, has a thickness less than the kerf thickness.

5. The chain saw of claim 5 wherein the lower surface of said bar is substantially planar and the lower kerf margin defined by said chain extends generally along a plane disposed at an incline relative to said lower surface.

6. A chain saw mountable on a powered vehicle to fell trees comprising
    plate-like chain-carrying means including a chain bar having a generally planar loop-defining chain run disposed thereon with an exposed cutting run portion and an opposed non-cutting run portion and having a generally planar lower surface extending between said cutting and non-cutting run portions for supporting said chain-carrying means on a cut tree surface during operation,
    a continuous loop saw chain operatively disposed in said run, and
    means drivingly connected to said chain for driving the chain around the run,
    said run being disposed in such a manner that said chain, during operation, defines a generally planar lower kerf margin which is disposed generally above and at an incline relative to said lower surface.

7. The chain saw of claim 6 wherein the lower kerf margin of said chain is disposed generally coincident with the plane of the lower surface of said bar along said cutting run portion.

8. The chain saw of claim 7 wherein said chain-carrying means further is generally wedge-shaped, having an upper surface tapering generally uniformly toward and adjacent said leading edge and covering the chain disposed in the non-cutting portion of said run.

9. The chain saw of claim 8 wherein said chain, during operation also defines a kerf of predetermined thickness and further wherein said chain-carrying means tapers to a thickness which only immediately adjacent said cutting run portion is less than the kerf thickness.

* * * * *